(12) United States Patent
Vaghasiya

(10) Patent No.: US 12,216,521 B2
(45) Date of Patent: Feb. 4, 2025

(54) COMMON RAIN BUFFER FOR MULTIPLE CURSORS

(71) Applicant: Micron Technology, Inc., Boise, ID (US)

(72) Inventor: Rakeshkumar Dayabhai Vaghasiya, Hyderabad (IN)

(73) Assignee: Micron Technology, Inc., Boise, ID (US)

( * ) Notice: Subject to any disclaimer, the term of this patent is extended or adjusted under 35 U.S.C. 154(b) by 25 days.

(21) Appl. No.: 17/887,268

(22) Filed: Aug. 12, 2022

(65) Prior Publication Data

US 2024/0054037 A1    Feb. 15, 2024

(51) Int. Cl.
*G06F 11/00* (2006.01)
*G06F 12/02* (2006.01)

(52) U.S. Cl.
CPC .......... *G06F 11/004* (2013.01); *G06F 12/023* (2013.01); *G06F 2212/1008* (2013.01); *G06F 2212/2022* (2013.01)

(58) Field of Classification Search
CPC .................................................. G06F 11/004
See application file for complete search history.

(56) References Cited

U.S. PATENT DOCUMENTS

| | | | | |
|---|---|---|---|---|
| 7,730,344 B1 * | 6/2010 | Perozo | ................... | G11B 20/18 714/6.13 |
| 8,276,043 B2 * | 9/2012 | Yano | ................... | G06F 11/1072 714/766 |
| 8,612,777 B2 * | 12/2013 | Sonnekalb | ........... | G11C 7/1006 714/701 |
| 8,843,805 B1 * | 9/2014 | Goel | ................... | G06F 11/1004 714/766 |
| 9,003,153 B2 * | 4/2015 | Arya | ..................... | G06F 11/108 714/763 |
| 10,318,365 B2 * | 6/2019 | Li | ........................ | G06F 11/1048 |
| 10,769,013 B1 * | 9/2020 | MacLaren | ............. | G06F 3/0619 |
| 2003/0084212 A1 * | 5/2003 | Butterfield | .............. | G06F 13/28 710/22 |
| 2003/0188251 A1 * | 10/2003 | Brown | ................. | G11C 7/1006 714/763 |
| 2007/0079217 A1 * | 4/2007 | Haugan | ............... | G06F 11/1048 714/763 |

(Continued)

*Primary Examiner* — Amine Riad
(74) *Attorney, Agent, or Firm* — Holland & Hart LLP

(57) ABSTRACT

Methods, systems, and devices for a common error protection buffer for multiple cursors are described. A memory device may receive a command to write data to a memory system. The memory device may assign portions of the data to respective pages of a first cursor and generate error protection data for the assigned data. The memory device may assign the generated error protection data to an error protection buffer common to multiple cursors, for example, by performing an combination operation. The memory device may increment a counter associated with the error protection buffer. The memory device may write a summary of contents of the error protection buffer and a position of each cursor related to the error protection data based on the counter satisfying a threshold. The memory device may perform a readback operation to facilitate garbage collection without losing error protection data.

25 Claims, 6 Drawing Sheets

(56) References Cited

U.S. PATENT DOCUMENTS

| | | | | |
|---|---|---|---|---|
| 2014/0040677 A1* | 2/2014 | Matsui | ............... | G06F 11/1666 714/54 |
| 2015/0248316 A1* | 9/2015 | Mogul | ............... | G06F 11/0763 714/6.11 |
| 2022/0291993 A1* | 9/2022 | Otsuka | ............... | G06F 11/1056 |
| 2023/0012525 A1* | 1/2023 | Kim | ..................... | G11C 29/42 |

* cited by examiner

| | Cursor 305-a | | | |
|---|---|---|---|---|
| | Plane 310-a | Plane 310-b | Plane 310-c | Plane 310-d |
| Page 315-a | | | | |
| Page 315-b | | | | |
| Page 315-c | | | | |
| Page 315-d | | | | |

| | Cursor 305-b | | | |
|---|---|---|---|---|
| | Plane 310-e | Plane 310-f | Plane 310-g | Plane 310-h |
| Page 315-e | | | | |
| Page 315-f | | | | |
| Page 315-g | | | | |
| Page 315-h | | | | |

335     340

| | | Cursor Positions 325 (Start, End) | | Valid Cursors 330 |
|---|---|---|---|---|
| | | Cursor 305-a | Cursor 305-b | |
| Start | | (0,0) | (0,0) | 0 |
| Snapshot 320-a | | (0,5) | (0,2) | 305-a, 305-b |
| Snapshot 320-b | | (6,10) | (3,6) | 305-a, 305-b |
| Snapshot 320-c | | (11,14) | (7,11) | 305-a, 305-b |
| Snapshot 320-d | | (0,0) | (0,2) | 305-b |

Cursor Information Table 335

COMMON RAIN BUFFER FOR MULTIPLE CURSORS

FIELD OF TECHNOLOGY

The following relates to one or more systems for memory, including a common error protection buffer for multiple cursors.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

BRIEF DESCRIPTION OF THE DRAWINGS

FIG. 3 illustrates an example of a configuration that supports a common error protection buffer for multiple cursors in accordance with examples as disclosed herein.

DETAILED DESCRIPTION

Figure 1:
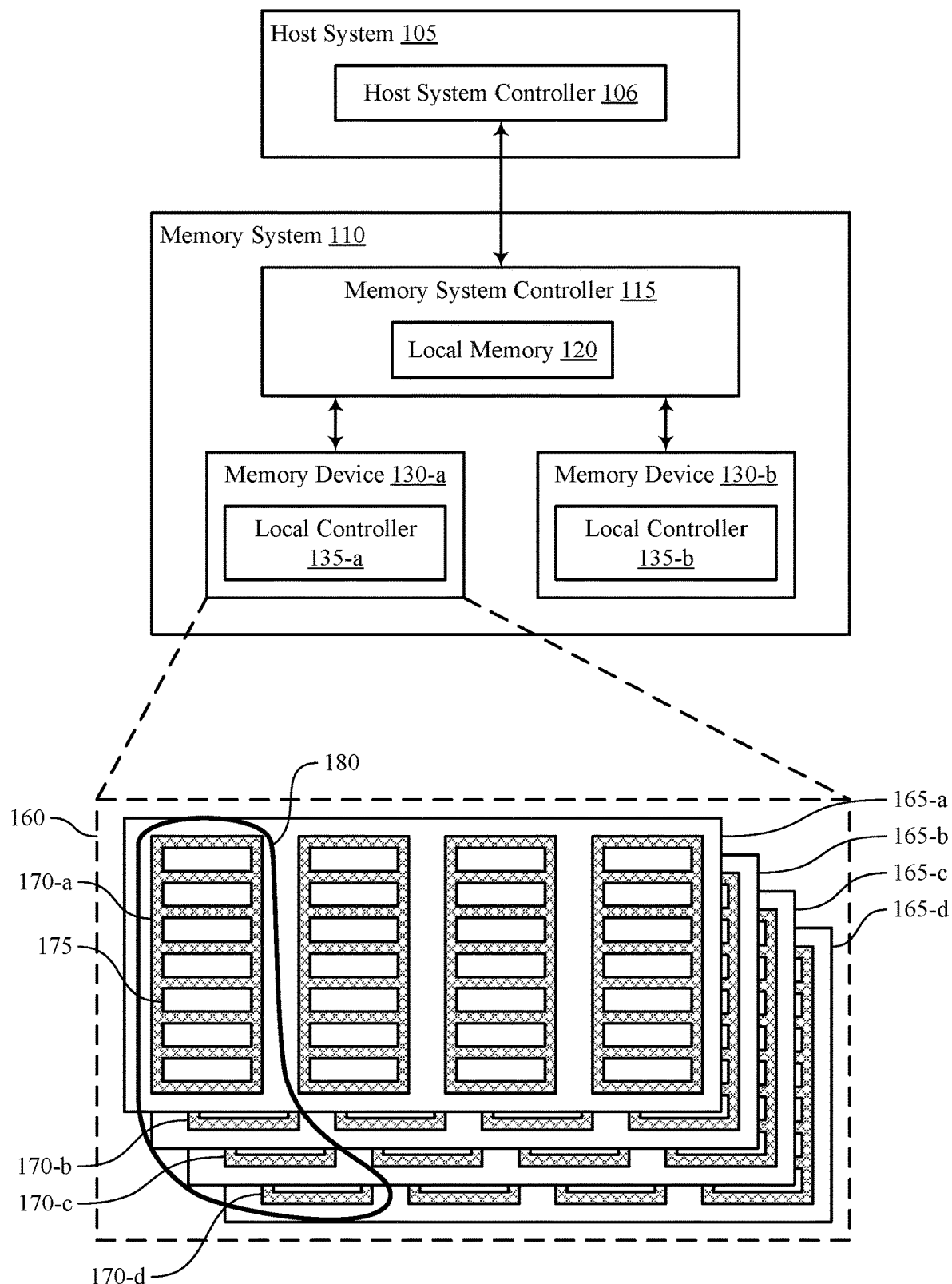
FIG. 1 illustrates an example of a system that supports a common error protection buffer for multiple cursors in accordance with examples as disclosed herein.

A memory system, such as a NAND memory system, may implement an error protection configuration to improve the reliability of the memory system. For example, a memory system may implement an error protection configuration, such as a redundant array of independent NAND (RAIN) configuration, to protect data (e.g., data received from a host system) that is stored in the one or more memory media (e.g., memory blocks) of the memory system. In some cases, the memory system may include blocks of memory cells configured as single-level cell (SLC) blocks that store one bit per cell and blocks configured as multiple-level cell blocks that store two or more bits of information per cell (e.g., multi-level cells (MLCs), tri-level cells (TLCs), quad-level cells (QLCs)). Because the blocks include different types of data (e.g., single bit data, multiple bit data), the memory system may utilize different cursors for each type of data (e.g., a separate cursor for each open zone of blocks) and may generate error protection data for each cursor. In some memory systems, each cursor is associated with a respective error protection buffer (e.g., one error protection buffer per one cursor). For example, a first error protection buffer includes error protection data associated with the data of a first cursor and a second error protection buffer includes error protection data associated with the data of a second cursor. However, in some error protection configurations, having a one-to-one mapping of error protection buffers to cursors may result in overprovisioning of random access memory of the memory system, reduced performance in response to switching between cursors, and limiting capabilities related to parallel cursor management, among other drawbacks for the memory system.

The techniques described herein enable a memory system to maintain common error protection buffers for multiple cursors, which will result in a more efficient error protection system. For example, a memory device may receive a command to write data to a memory system. The memory device may assign (e.g., store, record, update, write) portions of the data to respective pages of a first cursor and generate (e.g., determine, create, form) error protection data for the assigned data. The memory device may assign the generated error protection data to an error protection buffer (e.g., virtual blocks reserved for error protection data) common to multiple cursors, for example, by performing an operation (e.g., a combination, a logical operation such as exclusive OR (XOR)). For example, the common error protection buffer may include error protection data associated with various cursors. The memory device may combine the error protection data already in the buffer with the generated error protection data and store the combined error protection data in the common error protection buffer. As a result of having a one-to-many mapping (e.g., one error protection buffer for multiple cursors), the memory device may utilize the saved space (e.g., virtual blocks) for other operations.

In some cases, the memory device may increment a counter associated with the error protection buffer to track (e.g., count, record) a quantity of pages of the error protection buffer that include valid error protection data. Once the counter satisfies a threshold (e.g., the pages of the error protection buffer are full of valid data), the memory device may write a summary of contents (e.g., a snapshot) of the error protection buffer and a position (e.g., a starting and ending position) of each cursor related to the error protection data and then flush (e.g., empty, restart) the error protection buffer to receive further error protection data. The memory device may access error protection data associated with a specific cursor by performing another combination on the summary of contents based on the relevant cursor positions and the previous combination. In some examples, the techniques may also include a readback feature to facilitate garbage collection operations without losing error protection data.

Figure 2:
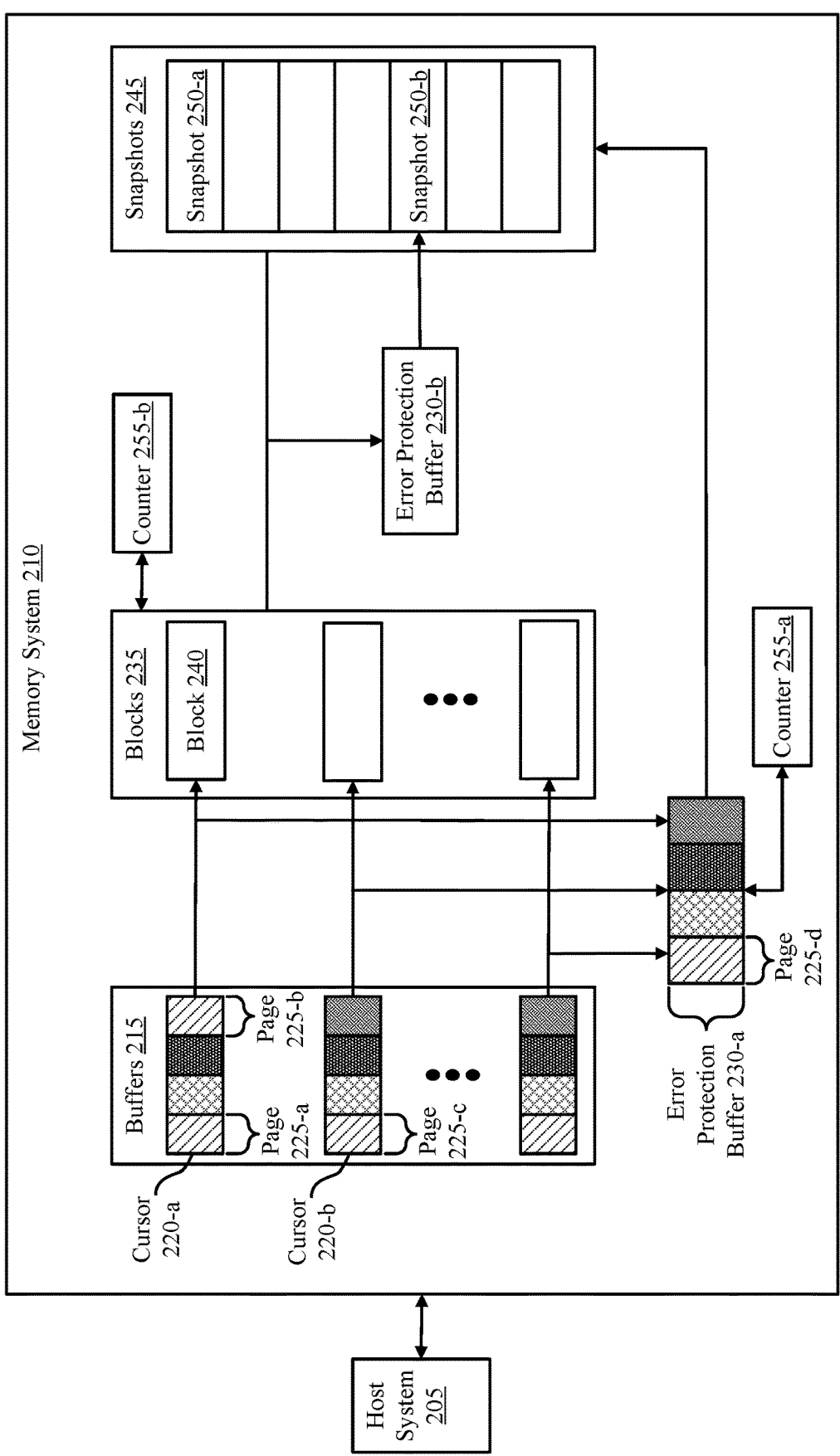
FIG. 2 illustrates an example of a system that supports a common error protection buffer for multiple cursors in accordance with examples as disclosed herein.

Features of the disclosure are initially described in the context of systems with reference to FIGS. 1 through 2. Features of the disclosure are described in the context of a configuration and a process flow with reference to FIGS. 3 through 4. These and other features of the disclosure are further illustrated by and described in the context of an apparatus diagram and flowchart that relate to a common error protection buffer for multiple cursors with reference to FIGS. 5 through 6.

FIG. 1 illustrates an example of a system 100 that supports a common error protection buffer for multiple cursors in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-$a$ and 130-$b$ are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support a common error protection buffer for multiple cursors. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some cases, the memory system 110 may implement an error protection configuration that supports recovery of uncorrectable data. For example, the memory system 110 may utilize a redundant array of independent NAND (RAIN) configuration. The RAIN configuration may relate to generating error protection data (e.g., parity bits) for a quantity of data (e.g., 1 parity bit for every 7, 15, 127, etc., data bits) received from the host system 105. The memory system 110 may store the parity bits in error protection buffers (e.g., RAIN buffers) while the received data is being processed (e.g., stored in write buffers (e.g., cursors) until a virtual block 180 (e.g., NAND) is designated for the data). In some cases, the physical plane level RAIN may have a significant overprovisioning impact on blocks 170 (e.g., user data blocks). To decrease the impact, the system 100 may extend the parity bits from one page line to multiple page lines. This may be referred to as multi-page RAIN.

To support error protection, a memory system 110 may maintain various error protection buffers (e.g., RAIN buffers) for various cursors of the memory system. For example, the system 100 may open multiple host cursors for different memory partitions created by the host system 105 (e.g., extended memory partition (EM1), normal partition), for separate types of data (e.g., write booster data, non-write booster data, SLC data, MLC data, TLC data, QLC data), for reducing write amplification (e.g., using small chunk cursors), among other examples. Additionally, in some cases, the system 100 may be configured according to a configuration (e.g., zonal namespace (ZNS)) over a file system (e.g., flash friendly file system (F2FS)). According to the configuration, the system 100 may open one cursor for each open zone (e.g., six defined zones in the F2FS file system) to avoid garbage collection. For each open cursor, the memory system 110 may generate respective error protection data to be stored in a respective error protection buffer associated with each respective cursor. However, this one-to-one mapping of error protection buffers and cursors utilizes a relatively large quantity of storage (e.g., space, virtual blocks 180), thereby resulting in an inefficient and limited system 100.

The techniques described herein enable a memory system 110 to maintain common error protection buffers for multiple cursors, which may result in a more efficient error protection system. For example, a memory device 130 may receive a command to write data to a memory die 160. The memory device 130 may assign (e.g., store, record, update, write) portions of the data to respective pages 175 (e.g., virtual pages) of a first cursor and generate (e.g., determine, create, form) error protection data for the assigned data. The memory device may assign the generated error protection data to an error protection buffer (e.g., virtual blocks 180 reserved for error protection data) common to multiple cursors, for example, by performing an operation (e.g., a combination, a logical operation such as exclusive OR (XOR)). For example, the common error protection buffer may include error protection data associated with various cursors. The memory device 130 may combine the error protection data already in the buffer with the generated error protection data and store the combined error protection data in the common error protection buffer. As a result of having a one-to-many mapping (e.g., one error protection buffer for multiple cursors), the memory device 130 may utilize the saved space (e.g., virtual blocks 180) for other operations.

In some cases, the memory device 130 may increment a counter associated with the error protection buffer to track (e.g., count, record) a quantity of pages of the error protection buffer that include valid error protection data. Once the counter satisfies a threshold (e.g., the pages of the error protection buffer are full of valid data), the memory device may write a summary of contents (e.g., a snapshot) of the error protection buffer and a position (e.g., a starting and ending position) of each cursor related to the error protection data and then flush (e.g., empty, restart) the error protection buffer to receive further error protection data. In some cases, the memory device 130 may store the summary of contents in a summary of contents (e.g., snapshot) information data structure (e.g., table). For example, the table may include fifteen entries (e.g., the combination of one and the product of seven cursors (e.g., for six zones and one legacy) and two) to comply with ZNS and F2FS standards. The memory device 130 may access error protection data associated with a specific cursor by performing another combination on the summary of contents based on the relevant cursor positions and the previous combination. In some examples, the techniques may also include a readback feature to facilitate garbage collection operations without losing error protection data.

FIG. 2 illustrates an example of a system 200 that supports a common error protection buffer for multiple cursors in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively. Additionally, buffers 215, blocks 235, snapshots 245, and pages 225, may be examples of the virtual blocks 180 and pages 175.

The memory system 210 may include a quantity of buffers 215. For example, the memory system 210 may include a cursor 220-*a* and a cursor 220-*b* (although any quantity of cursors 220 may be included in the buffers 215). The cursors 220 may include any quantity of pages 225 (e.g., a page 225-*a*, a page 225-*b*, and a page 225-*c*) that store data to be written in memory cells (e.g., non-volatile memory, NAND). In the example of FIG. 2, the illustrated pages 225 included in the cursors 220 may correspond to pages 225 that store valid data (e.g., data received from the host system 205), and invalid pages and empty pages that may be included in the cursors 220 may not be shown.

The memory system 210 may also include an error protection buffer 230-*a* for storing respective error protection data associated with respective cursors 220. The error protection buffer 230-*a* may include multiple pages 225 (e.g., a page 225-*d*) that correspond to one or more pages 225 from various cursors 220. The memory system 210 may further include a counter 255-*a* in electronic communication with the error protection buffer 230-*a*.

The memory system 210 may include a quantity of blocks 235. For example, the blocks 235 may include any quantity of blocks 240. In some cases, the blocks 235 may include non-volatile memory blocks 240 (e.g., NAND blocks 240). The memory system 210 may further include a counter 255-*b* in electronic communication with the blocks 235. The quantity of blocks 235 may be examples of virtual blocks, in some cases.

The memory system 210 may also include snapshots 245. For example, the snapshots 245 may include a snapshot 250-*a* and a snapshot 250-*b* (although any quantity of snapshots 250 may be included). In some cases, the snapshots 245 may include a summary of contents of error protection data associated with the error protection buffer 230-*a*. In some cases, a cursor position (e.g., a beginning and ending position) indicating which data included in the summary of contents corresponds to which cursor 220 may be stored in a second memory location.

In some cases, the memory system 210 may experience one or more errors. For example, NAND devices may be prone to errors in response to exposure to high temperatures, in response to performing various operations (e.g., read, write, update), over time, etc. In some examples, failures (e.g., a failure in operation of page programming) may extend beyond a single plane (e.g., plane 165). Thus, die level protection may help to overcome program failure. In some implementations, the die level protection may be realized through the use of parity bits (e.g., some firmware may use Quadx parity to recover data from program failure). The memory system may generate the parity bits according to an error protection configuration (e.g., a RAIN configuration), where the parity bits (e.g., error correction data, RAIN bits) are for one or more page lines (e.g., one error protection bit per 7, 15, 127, or more data bits across one or more pages). The error protection data may allow the memory system 210 to recover corrupt data (e.g., if program is not successful, but the memory system 210 returned a success, the memory system 210 may use the error protection data to recover the uncorrectable error) via logical operations (e.g., XOR).

In some examples, the memory system 210 may receive data from the host system 205 and store the data in temporary storage. For example, the memory system 210 may store respective data in various cursors, each cursor pertaining to a type of data (e.g., SLC, TLC, write boosted, non-write boosted, extended memory partitioning, and the like). In some examples, the memory system 210 (e.g., firmware of the memory system 210) may use buffers 215 as temporary storage for the data being transferred between the host system 205 and internal memory blocks (e.g., non-volatile memory) of the memory system 210. Using the buffers 215 to temporarily store the data during transfers may allow the data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). A temporary storage of data within a buffer 215 may refer to the storage of data in the buffer 215 during the execution of access commands or until a threshold (e.g., a page data limit) is satisfied. For example, after the buffer 215 is filled (e.g., written completely, to a threshold quantity), the associated data may no longer be maintained in the buffer 215 (e.g., may be transferred to nonvolatile memory and overwritten with data for additional access commands).

While the data is being stored and prepped for transfer, the memory system 210 may generate and store error protection data (e.g., RAIN parity data). For example, some memory systems 210 may store error protection data associated with a respective cursor 220 in respective error protection buffers 230 (e.g., RAIN buffers). The error protection buffers 230 may have a one-to-one mapping with the respective cursor 220. For example, the memory system 210 (e.g., the firmware of the memory system 210) may use a buffer for accumulating error protection data. In response to the host system 205 switching data corresponding to a second cursor 220, the memory system 210 may store the error protection data in a respective error protection buffer 230 associated with the first cursor 220 and start accumulating error protection data of another cursor 220. Thus, the memory system 210 (e.g., the firmware of the memory system 210) may reserve multiple virtual blocks 180 (e.g., at least one per cursor) for storage of this temporary error protection data. However, reserving a virtual block 180 per cursor for error protection buffers utilizes a relatively large quantity of storage, thereby resulting in overprovisioning and inefficiencies for the system 200.

The examples described with reference to FIG. 2 may depict examples of generating and storing error protection data using a common error protection buffer 230-a. For example, the memory system 210 may determine a quantity of pages for multipage error protection data and allocate a common error protection buffer 230-a for multiple cursors of a same type (e.g., SLC, TLC, and the like). In some instances, the memory system 210 may perform a flush (e.g., write) for a cursor 220 (e.g., write the data stored at the cursors 220 to blocks 235). The memory system 210 may generate first error protection data for data stored in page 225-a of cursor 220-a and assign (e.g., store, record, update, write) the first error protection data to page 225-d of the error protection buffer 230-a. Additionally, the memory system 210 may generate second error protection data for data stored in the page 225-c and third error protection data for data stored in the page 225-b and assign the second error protection data and the third error protection data to the page 225-d of the error protection buffer 230-a.

In some cases, assigning the error protection data to the page 225-d may include performing an operation. For example, the memory system 210 may perform an XOR operation to combine the first error protection data with the second error protection data and with the third error protection data. Thus, a fourth error protection data is generated based on the first error protection data, the second error protection data, and the third error protection data, and stored (e.g., written, recorded, updated) in the page 225-d. In some examples, the memory system 210 may perform the XOR operation for combining new error protection data in the common error protection buffer 230-a in response to the flush occurring for any cursor 220.

In some implementations, the memory system 210 may maintain a counter 255-a associated with the error protection buffer 230-a. For example, the counter 255-a may count (e.g., track) a quantity of page lines that have been combined in the error protection buffer 230-a. If the counter 255-a satisfies a threshold (e.g., the error protection buffer 230-a is full, a page line threshold has been crossed), the memory system 210 may record (e.g., generate, write, store) a summary of the contents (e.g., the snapshot 250-a) of the error protection buffer 230-a in snapshots 245 (e.g., in NAND) and record info of cursor positions (e.g., a start and end physical address of each cursor 220) in a second memory location (e.g., in RAM). The memory system 210 may reset (e.g., flush, overwrite) the error protection buffer 230-a after recording the summary of contents.

Additionally (e.g., after flushing the data of cursor 220-a to block 240), the memory system 210 may generate fifth error protection data from the data in the block 240 based on the counter 255-b satisfying a threshold (e.g., a readback boundary, a die line threshold). The memory system 210 may combine the fifth error protection data with a snapshot 250-a to generate sixth error protection data and write the sixth error protection data to the error protection buffer 230-b. The memory system 210 may generate a second summary of contents (e.g., snapshot 250-b) and cursor positions from the error protection buffer 230-b, write the snapshot 250-b to the snapshots 245, and release the corresponding block 240. In some cases, the counter 255-b may represent multiple counters 255, one for each block 240 included in the blocks 235.

While the example illustrated in FIG. 2 relates to three pages 225 of two separate cursors 220 it is understood that multiple combinations of different quantities of pages across different quantities of planes (e.g., planes 165) and quantities of cursors are supported by the techniques described herein. For example, the page 225-d may include error protection data from each cursor 220 of buffers 215, from each page 225 of a single cursor 220, from two planes of a page 225 of each cursor 220, or any combination thereof, among other examples.

FIG. 3 illustrates an example of a configuration 300 that supports a common error protection buffer for multiple cursors in accordance with examples as disclosed herein. In some examples, the configuration 300 may be an example of or implement aspects of a system 100, a system 200, or both, as described herein with reference to FIGS. 1 and 2. For example, a cursor 305, a plane 310, a page 315, and a snapshot 320 may be examples of or included as part of virtual blocks 180, cursors 220, planes 165, pages 175, pages 225, and snapshots 250, respectively, included in a memory system (e.g., a memory system 110, a memory system 210).

The configuration 300 may include one or more cursors 305 including one or more pages 315 and planes 310 that include data from a host system (e.g., a host system 105, a host system 205). For example, a cursor 305-a may include a page 315-a, a page 315-b, a page 315-c, and a page 315-d across a plane 310-a, a plane 310-b, a plane 310-c, and a plane 310-d. Similarly, a cursor 305-b may include a page 315-e, a page 315-f, a page 315-g, and a page 315-h across a plane 310-e, a plane 310-f, a plane 310-g, and a plane 310-h.

In some cases, a memory system may store error protection data in a buffer that is common for multiple cursors 305. For example, the memory system may generate error protection data for page 315-a and plane 310-a, plane 310-b, plane 310-c, and plane 310-c, page 315-b and plane 310-a, and plane 310-b, and page 315-e and plane 310-e, plane 310-f, and plane 310-g. The memory system may combine the generated error protection data in a common error protection buffer via an operation (e.g., XOR operation). After writing the error protection data into the common error protection buffer, a counter may increment for each page filled (e.g., counting page lines of the error protection buffer). In some cases, the counter may satisfy a threshold value (e.g., nine pages, eighteen pages, and the like) and the memory system may capture a snapshot 320-*a* (e.g., a summary of contents) of the error protection data. Additionally, the memory system may record a cursor position 325. For example, the memory system may record a starting position for cursor 305-*a* at position zero (e.g., page 315-*a* and plane 310-*a*) and an ending position for cursor 305-*a* at position five (e.g., page 315-*b* and plane 310-*b*), as well as a starting position and ending position for cursor 305-*b* (e.g., (0,2) for a starting position of page 315-*e* and plane 310-*e* and an ending position of page 315-*e* and plane 310-*g*). In some implementations, the positions may be saved in a volatile memory (e.g., RAM). Because data from both cursor 305-*a* and cursor 305-*b* are included in the snapshot 320-*a*, valid cursors 330 include both cursor 305-*a* and cursor 305-*b*.

In some examples, the memory system may record multiple snapshots 320 in a cursor information table 335 (e.g., snapshots 245 of FIG. 2). For example, the memory system may record a snapshot 320-*b* and a snapshot 320-*c* with corresponding starting and ending positions (e.g., (6,10) and (3,6) for snapshot 320-*b* and (11,14) and (7,11) for snapshot 320-*c*). In some cases, a second counter may keep track of a quantity of die lines. For example, the memory system may have filled cursor 305-*a* up to page 315-*d* and plane 310-*c* (e.g., position 14). The memory system may fill the page 315-*d* and plane 310-*d* (e.g., position 15) to fill four die lines of the cursor 305-*a* and begin to run parity for the data at position 15. The second counter may increment and satisfy a second threshold value (e.g., four die lines) and indicate to the memory system to perform a readback procedure for cursor 305-*a* (cursor 305-*b* may include an empty page 340 at page 315-*h* and plane 310-*h*, thus not satisfying the second threshold value.

In some cases, the readback procedure may be a garbage collection readback in which the memory system may perform readback after a virtual block is closed (e.g., if no failure is detected, the virtual block included good data) and then releases the source block. During the readback procedure, the memory system may verify whether there is an error associated with a page 315 of the cursors 305 and perform a recovery operation based on determining an error. For example, the memory system may determine an error associated with the page 315-*a*. The memory system may generate error protection data for the data in the cursor 305-*a* excluding the page 315-*a* (e.g., where the error was identified). The memory system may then perform an XOR operation to combine the snapshot 320-*a* and the generated error protection data excluding the page 315-*a*. A characteristic of the XOR operation allows for a first quantity that is combined with a second quantity twice to equal the first number. For example, 0xABC XORed with 0xDEF XORed with 0xDEF is equal to 0xABC. Thus, the memory system may recover (e.g., determine, extract) the error protection data (e.g., parity) of the error page from the snapshot 320-*a* based on the snapshot 320-*a* and the generated error protection data and write the recovered error protection data in a temporary error protection buffer (e.g., error protection buffer 230-*b* of FIG. 2). The memory system may recover the lost (e.g., failed) page 315-*a* using the recovered error protection data. The memory system may then generate error protection data including the recovered page 315-*a* and write second error protection data into the temporary error protection buffer based on combining the error protection data including the recovered page 315-*a* and the snapshot 320-*a*. The memory system may discard the error protection data associated with the cursor 305-*a* (e.g., as the data of cursor 305-*a* has been recovered and released) and capture (e.g., record, generate) a snapshot 320-*d* that includes data from cursor 305-*b* (e.g., valid cursors 330 is updated to exclude 305-*a*). In such a manner, the memory system may enable co-mingling of error protection data in a common buffer and in non-volatile memory and retrieval of specific error protection data from the co-mingled locations.

Alternatively, the memory system may not determine an error. The memory system may generate error protection data for the cursor 305-*a* from position (0,5) based on the cursor positions 325 and combine the generated error protection data with snapshot 320-*a*. The memory system may discard the error protection data associated with the cursor 305-*a* (from position (0,5)) and capture a snapshot 320-*d* that includes data from cursor 305-*b* (e.g., valid cursors 330 is updated to exclude 305-*a*).

While the examples illustrated in FIG. 3 are used to describe the techniques of error protection using a common error protection buffer, it is understood that multiple additional examples could be facilitated by the described techniques. For example, the memory system may utilize three or more cursors with five or more pages and five or more planes, or any combination thereof. The threshold may be eighteen pages and six die line, or any quantity of pages and die lines.

Figure 4:
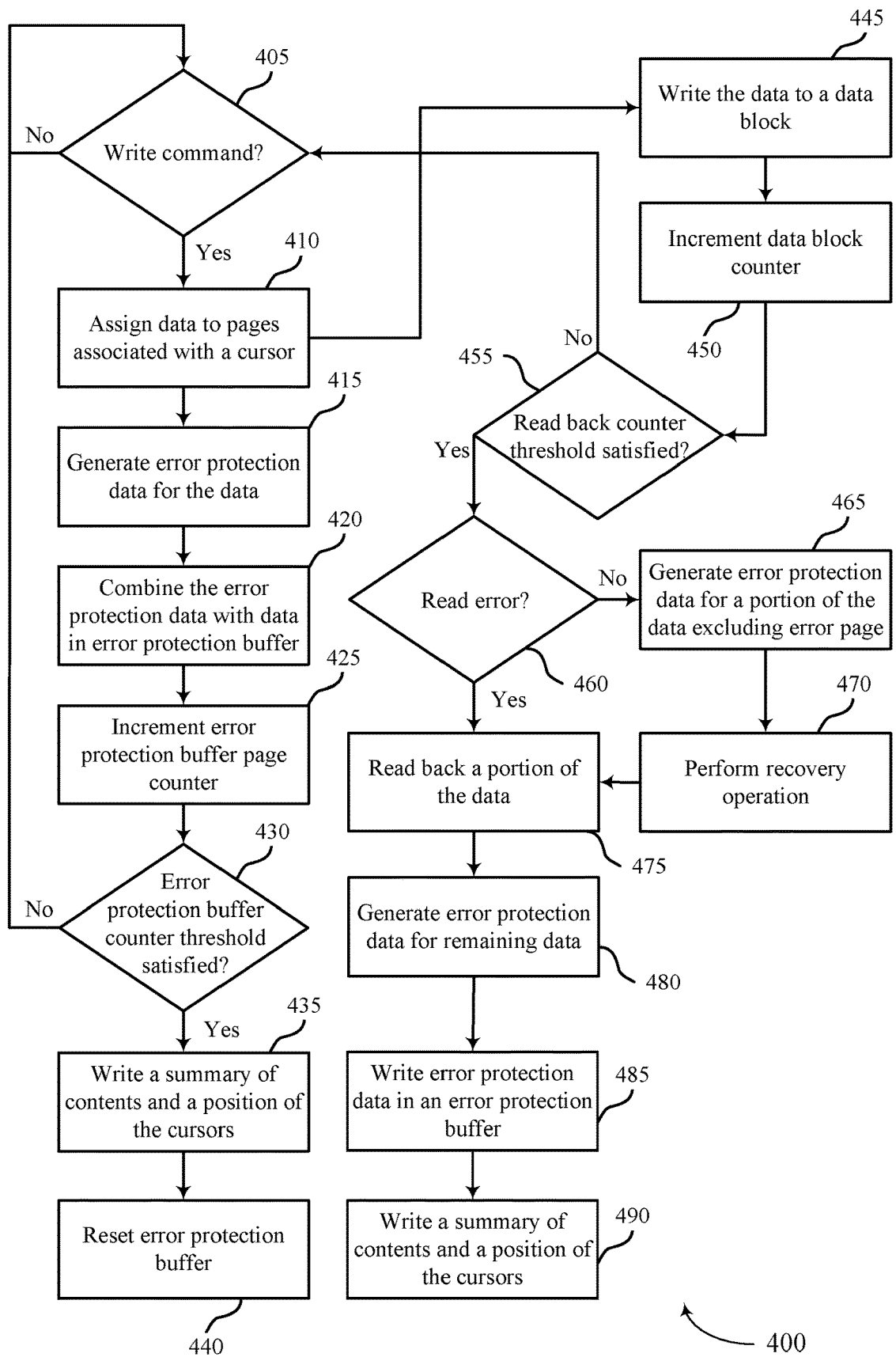
FIG. 4 illustrates an example of a process flow that supports a common error protection buffer for multiple cursors in accordance with examples as disclosed herein.

FIG. 4 illustrates an example of a process flow 400 that supports a common error protection buffer for multiple cursors in accordance with examples as disclosed herein. Aspects of the process flow 400 may be implemented by a controller, among other components. Additionally, or alternatively, aspects of the process flow 400 may be implemented as instruction stored in memory (e.g., firmware stored in a memory coupled with a memory device). For example, the instructions, when executed by a controller (e.g., the memory device), may cause the controller to perform the operation of the process flow 400. The process flow 400 may be implemented by a device such as a memory device or a memory system as described herein with reference to FIGS. 1 through 3. The device may include multiple cursors, a common error protection buffer, a snapshot information data structure (e.g., table), counters, and other components. By implementing the process flow 400, the device may preserve storage capacity (in both random access memory, such as SRAM, and non-volatile memory, such as NAND), improve performance, provide error protection for multiple cursors, and error protection for parallel writes for multiple cursors (e.g., according to ZNS and F2FS).

At 405, it may be determined (e.g., by a memory device) whether the memory device has received a command to write data to a memory system. If, at 405, the memory device determines that the memory device has not received a command to write data to the memory system, the memory device may return to 405. If the memory device determines that the memory device has received the command, the memory device may proceed to 410.

At 410, the data may be assigned (e.g., by the memory device) to one or more pages associated with a cursor of the memory system based on the command. For example, the command may indicate a type of data (e.g., SLC, MLC, TLC, write booster, non-write booster, enhanced partition, and the like) and the data to be written. The memory device may write (e.g., store, record) the data in the cursor based on the type of the data.

At 415, error protection data may be generated (e.g., by the memory device) for the data based on an error protection configuration. For example, the error protection configuration may be a RAIN configuration that may indicate a ratio of data bits to parity bits (e.g., one error protection bit for every seven data bits, and the like). The memory device may generate the error protection data based on the ratio of data bits and, in some examples, across multiple pages of the cursor. The memory device may assign the error protection data to an error protection buffer that is common to multiple cursors of the memory system. The error protection buffer for storing multiple error protection data associated with the multiple cursors. The error protection data may be used for recovering lost data. Lost data (e.g., uncorrectable data, failed data) may occur as the memory system performs various operations, as in response to exposure to high temperatures, among other examples.

At 420, an operation may be performed (e.g., by the memory device) to generate second error protection data by combining the error protection data with the multiple error protection data of the error protection buffer. For example, the memory device may flush (e.g., write) a cursor (and the data of each page of the cursor) of the multiple cursors to a data block. The memory device may combine (e.g., perform an XOR operation) the error protection data of the cursor (e.g., one or more pages of the cursor) with error protection data of other cursors in the error protection buffer. The memory device may write the second error protection data in the error protection buffer based on the combination.

At 425, a counter associated with the error protection buffer may be incremented (e.g., by the memory device). In some cases, the counter may be a multi-page counter. For example, the counter may count a quantity of pages written to the error protection buffer. At 430, the memory device may determine whether the counter satisfies a threshold associated with a quantity of pages (e.g., a multi-page threshold, the error protection buffer is full). If, at 430, the memory device determines that the counter has not satisfied the threshold, the memory device may return to 405. If the memory device determines that the counter satisfies the threshold, the memory device may proceed to 435.

At 435, a summary of contents of the error protection buffer and a position of the multiple cursors may be written to a non-volatile memory (e.g., by the memory device). For example, the memory device may write the summary of contents (e.g., a snapshot) in a first memory location (e.g., including the snapshot information data structure) associated with a first type of memory (e.g., a non-volatile memory, NAND), and write a starting position and an ending position associated with each cursor in a second memory location associated with a second type of memory (e.g., a volatile memory, RAM) different from the first type of memory.

At 440, the error protection buffer may be reset (e.g., by the memory device) and return to 405. For example, the contents of the error protection buffer may be saved (e.g., stored, written to the first memory location) and the error protection buffer may be flushed to store additional error protection data common to multiple cursors.

At 445, the data of the cursor may be written (e.g., by the memory device) to a data block associated with the cursor (e.g., block 240 of FIG. 2). For example, the memory device may flush the data of the cursor if the cursor is full and store the data in a memory location associated with the first type of memory (e.g., NAND).

At 450, a second counter associated with the data block may be incremented (e.g., by the memory device). For example, the second counter may count (e.g., track, record) a quantity of die lines of each data block. In some cases, each data block may be associated with a respective counter. At 455, the memory device may determine whether the second counter satisfies a second threshold associated with reading back the data (e.g., a quantity of die lines, a die line threshold, the data block is full). If, at 455, the memory device determines that the second counter has not satisfied the threshold, the memory device may return to 405. If the memory device determines that the second counter satisfies the threshold, the memory device may proceed to 460.

At 460, it may be determined (e.g., by the memory device) whether there is a read error. For example, a page of the memory system may fail, include an error, be uncorrectable, or any combination thereof. If, at 460, the memory device does not determine a read error, the memory device may proceed to 465. If the memory device determines a read error associated with a page of the data block, the memory device may proceed to 475.

At 465, third error protection data may be generated (e.g., by the memory device) for a portion of the data in the data block that excludes the page associated with the read error based on the position of the cursors. At 470, the memory device may perform a recover operation associated with the page with the read error. For example, the recovery operation may include performing a first operation (e.g., a logical operation, XOR) that combines the summary of contents with the third error protection data. By combining the summary of contents with the third error protection data, the memory device may generate fourth error protection data. Because of an XOR property (e.g., a first quantity XORed with a second quantity twice equals the first number), the fourth error protection data may be error protection data associated with the failed page. Based on the fourth error protection data, the memory device may recover the failed page and proceed to 475.

At 475, a portion of the data may be read back (e.g., by the memory device). For example, the memory device may perform a garbage collection procedure where the memory device determines that the data is good and releases the source block (e.g., the data block, the virtual block) to be overwritten (e.g., reused, reset) with further data from the host. The blocks associated with other cursors that have not satisfied the readback threshold may remain (e.g., not be released).

At 480, fifth error protection data may be generated (e.g., by the memory device) for the data in the data block. For example, the memory device may generate error protection data for the remaining data not released by the garbage collection procedure (e.g., data pertaining to cursor position (0,3) in FIG. 3). The memory device may perform an operation (e.g., a logical operation, XOR) to generate sixth error protection data by combining the third error protection data with the summary of contents (e.g., the snapshot) based on the cursor positions.

At 485, the sixth error protection data may be written (e.g., by the memory device) in a second error protection buffer (e.g., error protection buffer 230-*b* of FIG. 2) associated with the data block. For example, the second error protection buffer may be at a location different from the common error protection buffer. The second error protection buffer may be a temporary storage buffer that stores error protection data during the execution of the readback procedure and updating the snapshot information data structure.

At 490, a second summary of contents of the second error protection buffer and a second position of the multiple cursors of the second error protection buffer may be written (e.g., by the memory device). For example, the memory device may take a snapshot of the error protection buffer including the sixth error protection data without the portion of error protection data associated with the released page.

Thus, the snapshot information table may be updated to reflect the list of valid cursors (e.g., only the second cursor 305-b has valid data in the example of FIG. 3), and the snapshot information table may discard the first snapshot.

Figure 5:
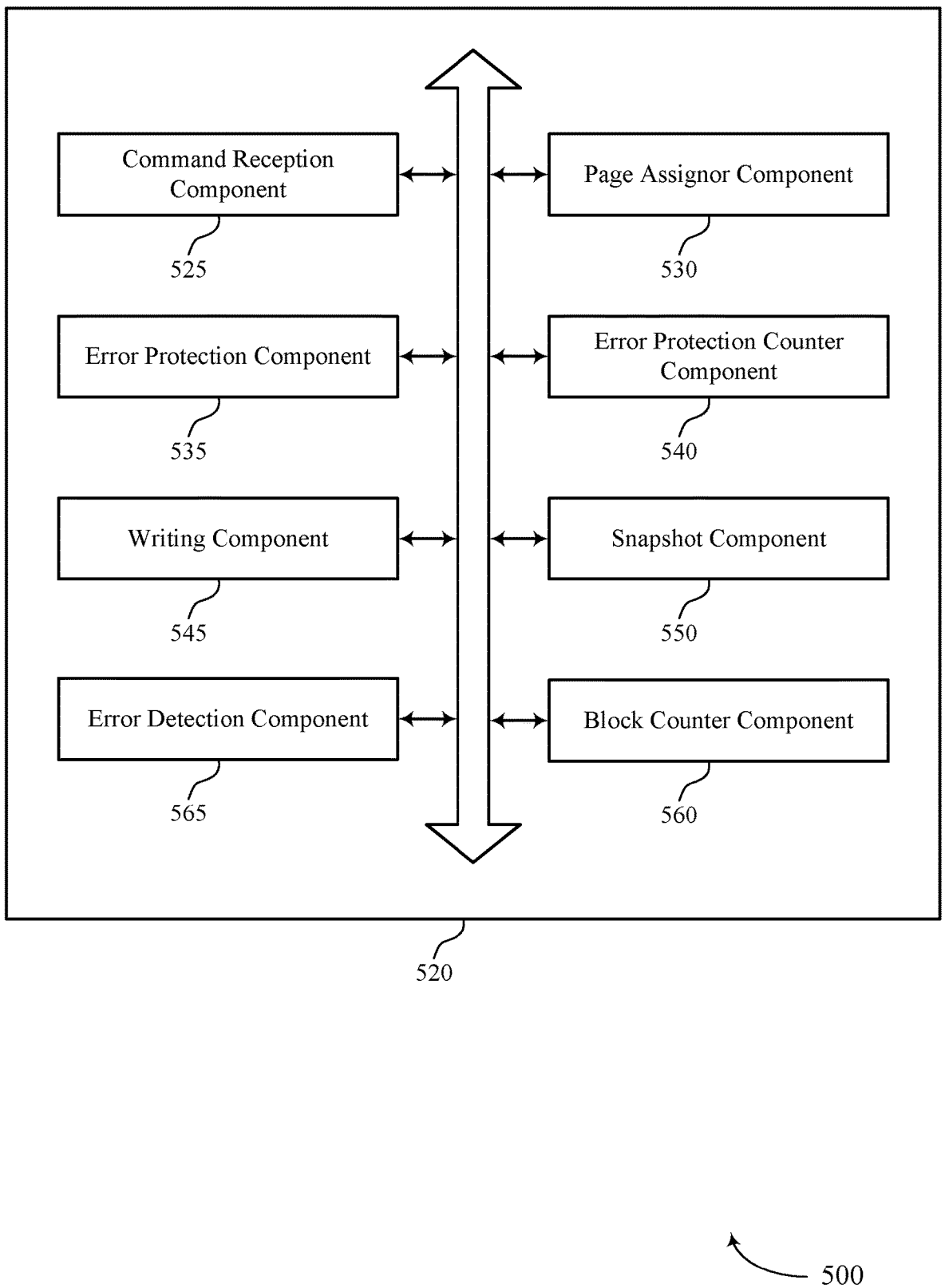
FIG. 5 shows a block diagram of a memory system that supports a common error protection buffer for multiple cursors in accordance with examples as disclosed herein.

FIG. 5 shows a block diagram 500 of a memory system 520 that supports a common error protection buffer for multiple cursors in accordance with examples as disclosed herein. The memory system 520 may be an example of aspects of a memory system as described with reference to FIGS. 1 through 4. The memory system 520, or various components thereof, may be an example of means for performing various aspects of a common error protection buffer for multiple cursors as described herein. For example, the memory system 520 may include a command reception component 525, a page assignor component 530, an error protection component 535, an error protection counter component 540, a writing component 545, a snapshot component 550, a block counter component 560, an error detection component 565, or any combination thereof. Each of these components may communicate, directly or indirectly, with one another (e.g., via one or more buses).

The command reception component 525 may be configured as or otherwise support a means for receiving a command to write data to a memory system. The page assignor component 530 may be configured as or otherwise support a means for assigning the data to one or more pages associated with a cursor of the memory system based at least in part on the command. The error protection component 535 may be configured as or otherwise support a means for generating error protection data for the data based at least in part on an error protection configuration. In some examples, the error protection component 535 may be configured as or otherwise support a means for assigning the error protection data to an error protection buffer that is common to a plurality of cursors of the memory system based at least in part on generating the error protection data, the error protection buffer for storing a plurality of error protection data associated with the plurality of cursors of the memory system.

In some examples, the error protection component 535 may be configured as or otherwise support a means for performing an operation to generate second error protection data by combining the error protection data with the plurality of error protection data associated with the plurality of cursors based at least in part on assigning the error protection data to the error protection buffer. In some examples, the error protection component 535 may be configured as or otherwise support a means for writing the second error protection data in the error protection buffer based at least in part on performing the operation. In some examples, the error protection counter component 540 may be configured as or otherwise support a means for incrementing a counter associated with the error protection buffer based at least in part on writing the second error protection data.

In some examples, the error protection counter component 540 may be configured as or otherwise support a means for determining whether the counter satisfies a threshold associated with a quantity of pages based at least in part on incrementing the counter. In some examples, the snapshot component 550 may be configured as or otherwise support a means for writing a summary of contents of the error protection buffer and a position of the plurality of cursors based at least in part on determining that the counter satisfies the threshold.

In some examples, to support writing the summary of contents and the position of the plurality of cursors, the snapshot component 550 may be configured as or otherwise support a means for writing the summary of contents in a first memory location associated with a first type of memory. In some examples, to support writing the summary of contents and the position of the plurality of cursors, the snapshot component 550 may be configured as or otherwise support a means for writing a starting position and an ending position associated with each cursor of the plurality of cursors in a second memory location associated with a second type of memory different from the first type of memory.

In some examples, the first type of memory includes non-volatile memory and the second type of memory includes volatile memory.

In some examples, the writing component 545 may be configured as or otherwise support a means for writing the data in a data block associated with the cursor based at least in part on the command, where generating the error protection data is further based at least in part on writing the data in the data block. In some examples, the block counter component 560 may be configured as or otherwise support a means for incrementing a second counter associated with the data block based at least in part on writing the data.

In some examples, the block counter component 560 may be configured as or otherwise support a means for determining whether the second counter satisfies a second threshold associated with reading back the data based at least in part on incrementing the second counter. In some examples, the error protection component 535 may be configured as or otherwise support a means for generating third error protection data for the data in the data block based at least in part on whether the second counter satisfies the second threshold. In some examples, the error protection component 535 may be configured as or otherwise support a means for performing an operation to generate fourth error protection data for the data in the data block by combining the third error protection data with the summary of contents based at least in part on generating the third error protection data. In some examples, the error protection component 535 may be configured as or otherwise support a means for writing the fourth error protection data in a second error protection buffer associated with the data block based at least in part on generating the third error protection data, the second error protection buffer at a location different from the error protection buffer. In some examples, the snapshot component 550 may be configured as or otherwise support a means for writing a second summary of contents of the second error protection buffer and a second position of the plurality of cursors based at least in part on writing the fourth error protection data.

In some examples, the error detection component 565 may be configured as or otherwise support a means for determining an error associated with a page of the data block based at least in part on whether the second counter satisfies a second threshold associated with the data block. In some examples, the error protection component 535 may be configured as or otherwise support a means for generating third error protection data for a portion of the data in the data block that excludes the page based at least in part on determining the error and a position associated with the page. In some examples, the error protection component 535 may be configured as or otherwise support a means for performing a recovery operation associated with the page based at least in part on performing a first operation to generate fourth error protection data by combining the summary of contents and the third error protection data. In some examples, the error protection component 535 may be configured as or otherwise support a means for generating fifth error protection data for the data including the page based at least in part on performing the recovery operation. In some examples, the error protection component 535 may be configured as or otherwise support a means for writing sixth error protection data in a second error protection buffer associated with the data block based at least in part on performing a second operation to generate the sixth error protection data by combining the fifth error protection data and the summary of contents. In some examples, the snapshot component 550 may be configured as or otherwise support a means for writing a second summary of contents of the second error protection buffer and a second position of the plurality of cursors based at least in part on writing the sixth error protection data.

In some examples, the writing component 545 may be configured as or otherwise support a means for writing the data to a data block associated with the cursor based at least in part on assigning the data to the one or more pages. In some examples, the error protection component 535 may be configured as or otherwise support a means for writing second error protection data in a second error protection buffer associated with the data block based at least in part on determining that a counter associated with the data block satisfies a threshold associated with reading back the data, the second error protection data including a portion of the plurality of error protection data. In some examples, the snapshot component 550 may be configured as or otherwise support a means for writing a summary of contents of the second error protection buffer and a position of the plurality of cursors based at least in part on writing the second error protection data.

In some examples, the writing component 545 may be configured as or otherwise support a means for writing the data to a data block associated with the cursor based at least in part on assigning the data to the one or more pages. In some examples, the error protection component 535 may be configured as or otherwise support a means for generating second error protection data that excludes a page of the one or more pages based at least in part on determining an error associated with the page. In some examples, the error protection component 535 may be configured as or otherwise support a means for performing a recovery operation for the page based at least in part on performing an operation to generate third error protection data associated with the page by combining a summary of contents and the second error protection data. In some examples, the snapshot component 550 may be configured as or otherwise support a means for writing a second summary of contents and a position of the plurality of cursors based at least in part on the second error protection data.

In some examples, the cursor is associated with writing data in triple-level cells of the memory system. In some examples, a second cursor is associated with writing data in single-level cells of the memory system. In some examples, the error protection buffer is common to cursors associated with writing the data in the triple-level cells of the memory system.

In some examples, the plurality of error protection data includes the error protection data and second error protection data for second data associated with a plurality of pages associated with the plurality of cursors.

In some examples, the command reception component 525 may be configured as or otherwise support a means for receiving a second command to write second data to the memory system. In some examples, the error protection component 535 may be configured as or otherwise support a means for assigning second error protection data associated with a second page of the cursor to a second error protection buffer and third error protection data associated with a third page of a second cursor of the plurality of cursors to the second error protection buffer based at least in part on the second command.

In some examples, the command reception component 525 may be configured as or otherwise support a means for receiving a second command to write second data to the memory system. In some examples, the error protection component 535 may be configured as or otherwise support a means for assigning second error protection data for the second data associated with the one or more pages of the cursor to the error protection buffer based at least in part on the second command.

Figure 6:
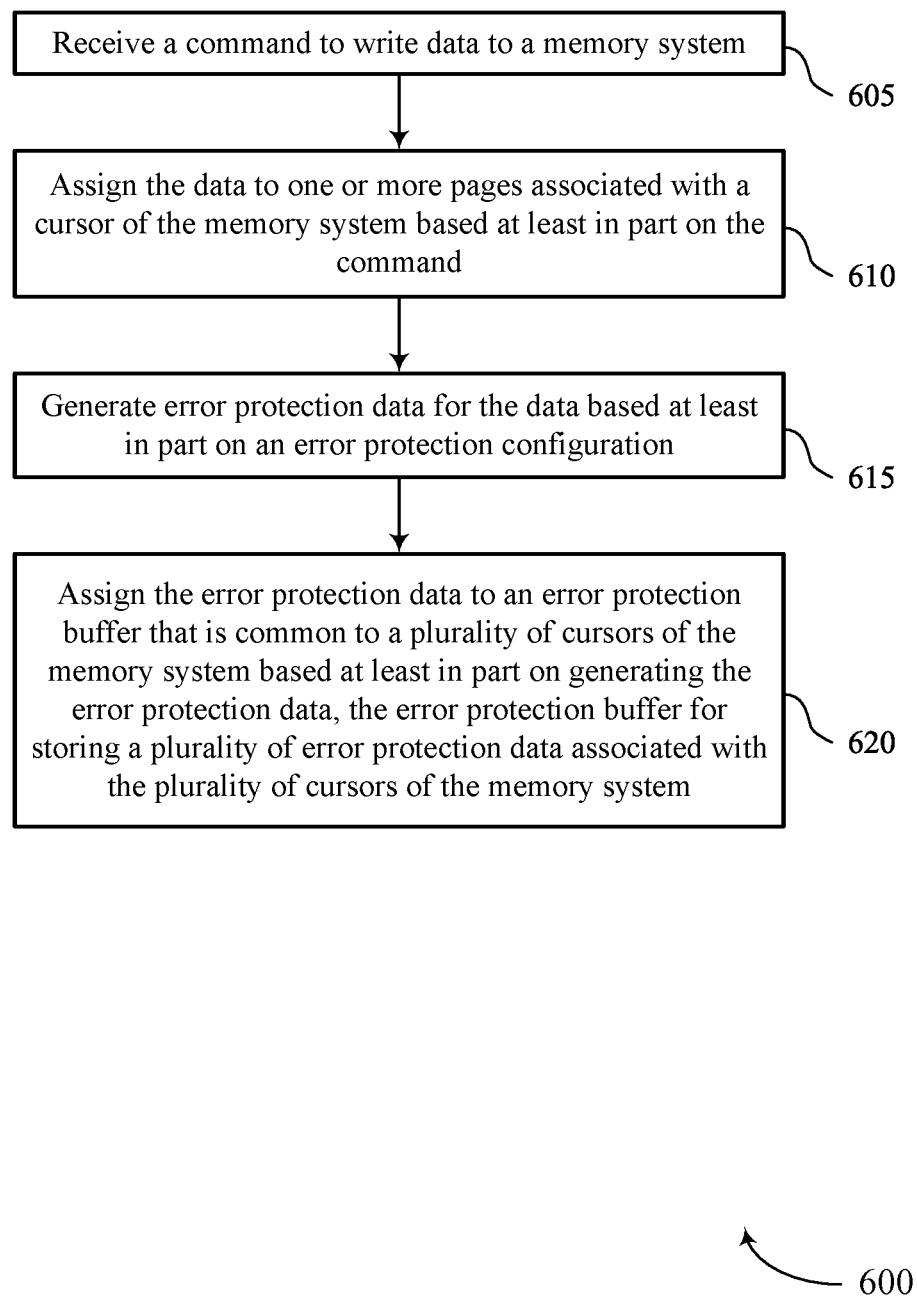
FIG. 6 shows a flowchart illustrating a method or methods that support a common error protection buffer for multiple cursors in accordance with examples as disclosed herein.

FIG. 6 shows a flowchart illustrating a method 600 that supports a common error protection buffer for multiple cursors in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include receiving a command to write data to a memory system. The operations of 605 may be performed in accordance with examples as disclosed herein. In some examples, aspects of the operations of 605 may be performed by a command reception component 525 as described with reference to FIG. 5.

At 610, the method may include assigning the data to one or more pages associated with a cursor of the memory system based at least in part on the command. The operations of 610 may be performed in accordance with examples as disclosed herein. In some examples, aspects of the operations of 610 may be performed by a page assignor component 530 as described with reference to FIG. 5.

At 615, the method may include generating error protection data for the data based at least in part on an error protection configuration. The operations of 615 may be performed in accordance with examples as disclosed herein. In some examples, aspects of the operations of 615 may be performed by an error protection component 535 as described with reference to FIG. 5.

At 620, the method may include assigning the error protection data to an error protection buffer that is common to a plurality of cursors of the memory system based at least in part on generating the error protection data, the error protection buffer for storing a plurality of error protection data associated with the plurality of cursors of the memory system. The operations of 620 may be performed in accordance with examples as disclosed herein. In some examples, aspects of the operations of 620 may be performed by an error protection component 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a command to write data to a memory system; assigning the data to one or more pages associated with a cursor of the memory system based at least in part on the command; generating error protection data for the data based at least in part on an error protection configuration; and assigning the error protection data to an error protection buffer that is common to a plurality of cursors of the memory system based at least in part on generating the error protection data, the error protection buffer for storing a plurality of error protection data associated with the plurality of cursors of the memory system.

Aspect 2: The method, apparatus, or non-transitory computer-readable medium of aspect 1, further including operations, features, circuitry, logic, means, or instructions, or any combination thereof for performing an operation to generate second error protection data by combining the error protection data with the plurality of error protection data associated with the plurality of cursors based at least in part on assigning the error protection data to the error protection buffer; writing the second error protection data in the error protection buffer based at least in part on performing the operation; and incrementing a counter associated with the error protection buffer based at least in part on writing the second error protection data.

Aspect 3: The method, apparatus, or non-transitory computer-readable medium of aspect 2, further including operations, features, circuitry, logic, means, or instructions, or any combination thereof for determining whether the counter satisfies a threshold associated with a quantity of pages based at least in part on incrementing the counter and writing a summary of contents of the error protection buffer and a position of the plurality of cursors based at least in part on determining that the counter satisfies the threshold.

Aspect 4: The method, apparatus, or non-transitory computer-readable medium of aspect 3, where writing the summary of contents and the position of the plurality of cursors includes operations, features, circuitry, logic, means, or instructions, or any combination thereof for writing the summary of contents in a first memory location associated with a first type of memory and writing a starting position and an ending position associated with each cursor of the plurality of cursors in a second memory location associated with a second type of memory different from the first type of memory.

Aspect 5: The method, apparatus, or non-transitory computer-readable medium of aspect 4, where the first type of memory includes non-volatile memory and the second type of memory includes volatile memory.

Aspect 6: The method, apparatus, or non-transitory computer-readable medium of any of aspects 3 through 5, further including operations, features, circuitry, logic, means, or instructions, or any combination thereof for writing the data in a data block associated with the cursor based at least in part on the command, where generating the error protection data is further based at least in part on writing the data in the data block and incrementing a second counter associated with the data block based at least in part on writing the data.

Aspect 7: The method, apparatus, or non-transitory computer-readable medium of aspect 6, further including operations, features, circuitry, logic, means, or instructions, or any combination thereof for determining whether the second counter satisfies a second threshold associated with reading back the data based at least in part on incrementing the second counter; generating third error protection data for the data in the data block based at least in part on whether the second counter satisfies the second threshold; performing an operation to generate fourth error protection data for the data in the data block by combining the third error protection data with the summary of contents based at least in part on generating the third error protection data; writing the fourth error protection data in a second error protection buffer associated with the data block based at least in part on generating the third error protection data, the second error protection buffer at a location different from the error protection buffer; and writing a second summary of contents of the second error protection buffer and a second position of the plurality of cursors based at least in part on writing the fourth error protection data.

Aspect 8: The method, apparatus, or non-transitory computer-readable medium of any of aspects 6 through 7, further including operations, features, circuitry, logic, means, or instructions, or any combination thereof for determining an error associated with a page of the data block based at least in part on whether the second counter satisfies a second threshold associated with the data block; generating third error protection data for a portion of the data in the data block that excludes the page based at least in part on determining the error and a position associated with the page; performing a recovery operation associated with the page based at least in part on performing a first operation to generate fourth error protection data by combining the summary of contents and the third error protection data; generating fifth error protection data for the data including the page based at least in part on performing the recovery operation; writing sixth error protection data in a second error protection buffer associated with the data block based at least in part on performing a second operation to generate the sixth error protection data by combining the fifth error protection data and the summary of contents; and writing a second summary of contents of the second error protection buffer and a second position of the plurality of cursors based at least in part on writing the sixth error protection data.

Aspect 9: The method, apparatus, or non-transitory computer-readable medium of any of aspects 1 through 8, further including operations, features, circuitry, logic, means, or instructions, or any combination thereof for writing the data to a data block associated with the cursor based at least in part on assigning the data to the one or more pages; writing second error protection data in a second error protection buffer associated with the data block based at least in part on determining that a counter associated with the data block satisfies a threshold associated with reading back the data, the second error protection data including a portion of the plurality of error protection data; and writing a summary of contents of the second error protection buffer and a position of the plurality of cursors based at least in part on writing the second error protection data.

Aspect 10: The method, apparatus, or non-transitory computer-readable medium of any of aspects 1 through 9, further including operations, features, circuitry, logic, means, or instructions, or any combination thereof for writing the data to a data block associated with the cursor based at least in part on assigning the data to the one or more pages; generating second error protection data that excludes a page of the one or more pages based at least in part on determining an error associated with the page; performing a recovery operation for the page based at least in part on performing an operation to generate third error protection data associated with the page by combining a summary of contents and the second error protection data; and writing a second summary of contents and a position of the plurality of cursors based at least in part on the second error protection data.

Aspect 11: The method, apparatus, or non-transitory computer-readable medium of any of aspects 1 through 10, where the cursor is associated with writing data in triple-level cells of the memory system; a second cursor is associated with writing data in single-level cells of the memory system; and the error protection buffer is common to cursors associated with writing the data in the triple-level cells of the memory system.

Aspect 12: The method, apparatus, or non-transitory computer-readable medium of any of aspects 1 through 11, where the plurality of error protection data includes the error protection data and second error protection data for second data associated with a plurality of pages associated with the plurality of cursors.

Aspect 13: The method, apparatus, or non-transitory computer-readable medium of any of aspects 1 through 12, further including operations, features, circuitry, logic, means, or instructions, or any combination thereof for receiving a second command to write second data to the memory system and assigning second error protection data associated with a second page of the cursor to a second error protection buffer and third error protection data associated with a third page of a second cursor of the plurality of cursors to the second error protection buffer based at least in part on the second command.

Aspect 14: The method, apparatus, or non-transitory computer-readable medium of any of aspects 1 through 13, further including operations, features, circuitry, logic, means, or instructions, or any combination thereof for receiving a second command to write second data to the memory system and assigning second error protection data for the second data associated with the one or more pages of the cursor to the error protection buffer based at least in part on the second command.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more memory devices; and
   processing circuitry coupled with the one or more memory devices and configured to cause the memory system to:
   receive a command to write data to the memory system;
   assign the data to one or more pages associated with a cursor of the memory system based at least in part on the command;
   generate error protection data for the data based at least in part on an error protection configuration; and
   assign the error protection data to an error protection buffer that is stored to a nonvolatile memory of the memory system and is common to a plurality of cursors of the memory system based at least in part on generating the error protection data, the error protection buffer for storing a plurality of error protection data associated with the plurality of cursors of the memory system.

2. The memory system of claim 1, wherein the processing circuitry is further configured to cause the memory system to:
   perform an operation to generate second error protection data by combining the error protection data with the plurality of error protection data associated with the plurality of cursors based at least in part on assigning the error protection data to the error protection buffer;
   write the second error protection data in the error protection buffer based at least in part on performing the operation; and
   increment a counter associated with the error protection buffer based at least in part on writing the second error protection data.

3. The memory system of claim 2, wherein the processing circuitry is further configured to cause the memory system to:
- determine whether the counter satisfies a threshold associated with a quantity of pages based at least in part on incrementing the counter; and
- write a summary of contents of the error protection buffer and a position of the plurality of cursors based at least in part on determining that the counter satisfies the threshold.

4. The memory system of claim 3, wherein the processing circuitry configured to write the summary of contents and the position of the plurality of cursors is further configured to cause the memory system to:
- write the summary of contents in a first memory location associated with a first type of memory; and
- write a starting position and an ending position associated with each cursor of the plurality of cursors in a second memory location associated with a second type of memory different from the first type of memory.

5. The memory system of claim 4, wherein the first type of memory comprises non-volatile memory and the second type of memory comprises volatile memory.

6. The memory system of claim 3, wherein the processing circuitry is further configured to cause the memory system to:
- write the data in a data block associated with the cursor based at least in part on the command, wherein generating the error protection data is further based at least in part on writing the data in the data block; and
- increment a second counter associated with the data block based at least in part on writing the data.

7. The memory system of claim 6, wherein the processing circuitry is further configured to cause the memory system to:
- determine whether the second counter satisfies a second threshold associated with reading back the data based at least in part on incrementing the second counter;
- generate third error protection data for the data in the data block based at least in part on whether the second counter satisfies the second threshold;
- perform an operation to generate fourth error protection data for the data in the data block by combining the third error protection data with the summary of contents based at least in part on generating the third error protection data;
- write the fourth error protection data in a second error protection buffer associated with the data block based at least in part on generating the third error protection data, the second error protection buffer at a location different from the error protection buffer; and
- write a second summary of contents of the second error protection buffer and a second position of the plurality of cursors based at least in part on writing the fourth error protection data.

8. The memory system of claim 6, wherein the processing circuitry is further configured to cause the memory system to:
- determine an error associated with a page of the data block based at least in part on whether the second counter satisfies a second threshold associated with the data block;
- generate third error protection data for a portion of the data in the data block that excludes the page based at least in part on determining the error and a position associated with the page;
- perform a recovery operation associated with the page based at least in part on performing a first operation to generate fourth error protection data by combining the summary of contents and the third error protection data;
- generate fifth error protection data for the data including the page based at least in part on performing the recovery operation;
- write sixth error protection data in a second error protection buffer associated with the data block based at least in part on performing a second operation to generate the sixth error protection data by combining the fifth error protection data and the summary of contents; and
- write a second summary of contents of the second error protection buffer and a second position of the plurality of cursors based at least in part on writing the sixth error protection data.

9. The memory system of claim 1, wherein the processing circuitry is further configured to cause the memory system to:
- write the data to a data block associated with the cursor based at least in part on assigning the data to the one or more pages;
- write second error protection data in a second error protection buffer associated with the data block based at least in part on determining that a counter associated with the data block satisfies a threshold associated with reading back the data, the second error protection data including a portion of the plurality of error protection data; and
- write a summary of contents of the second error protection buffer and a position of the plurality of cursors based at least in part on writing the second error protection data.

10. The memory system of claim 1, wherein the processing circuitry is further configured to cause the memory system to:
- write the data to a data block associated with the cursor based at least in part on assigning the data to the one or more pages;
- generate second error protection data that excludes a page of the one or more pages based at least in part on determining an error associated with the page;
- perform a recovery operation for the page based at least in part on performing an operation to generate third error protection data associated with the page by combining a summary of contents and the second error protection data; and
- write a second summary of contents and a position of the plurality of cursors based at least in part on the second error protection data.

11. The memory system of claim 1, wherein:
- the cursor is associated with writing data in triple-level cells of the memory system;
- a second cursor is associated with writing data in single-level cells of the memory system; and
- the error protection buffer is common to cursors associated with writing the data in the triple-level cells of the memory system.

12. The memory system of claim 1, wherein the plurality of error protection data comprises the error protection data and second error protection data for second data associated with a plurality of pages associated with the plurality of cursors.

13. The memory system of claim 1, wherein the processing circuitry is further configured to cause the memory system to:

receive a second command to write second data to the memory system; and assign second error protection data associated with a second page of the cursor to a second error protection buffer and third error protection data associated with a third page of a second cursor of the plurality of cursors to the second error protection buffer based at least in part on the second command.

14. The memory system of claim 1, wherein the processing circuitry is further configured to cause the memory system to:

receive a second command to write second data to the memory system; and assign second error protection data for the second data associated with the one or more pages of the cursor to the error protection buffer based at least in part on the second command.

15. A non-transitory computer-readable medium storing code comprising instructions which, when executed by processing circuitry of an electronic device, cause the electronic device to:

receive a command to write data to a memory system;

assign the data to one or more pages associated with a cursor of the memory system based at least in part on the command;

generate error protection data for the data based at least in part on an error protection configuration; and assign the error protection data to an error protection buffer that is stored to a nonvolatile memory of the memory system and is common to a plurality of cursors of the memory system based at least in part on generating the error protection data, the error protection buffer for storing a plurality of error protection data associated with the plurality of cursors of the memory system.

16. The non-transitory computer-readable medium of claim 15, wherein the instructions, when executed by the processing circuitry of the electronic device, further cause the electronic device to:

perform an operation to generate second error protection data by combining the error protection data with the plurality of error protection data associated with the plurality of cursors based at least in part on assigning the error protection data to the error protection buffer;

write the second error protection data in the error protection buffer based at least in part on performing the operation; and increment a counter associated with the error protection buffer based at least in part on writing the second error protection data.

17. The non-transitory computer-readable medium of claim 16, wherein the instructions, when executed by the processing circuitry of the electronic device, further cause the electronic device to:

determine whether the counter satisfies a threshold associated with a quantity of pages based at least in part on incrementing the counter; and write a summary of contents of the error protection buffer and a position of the plurality of cursors based at least in part on determining that the counter satisfies the threshold.

18. The non-transitory computer-readable medium of claim 17, wherein the instructions, when executed by the processing circuitry of the electronic device, further cause the electronic device to:

write the data in a data block associated with the cursor based at least in part on the command, wherein generating the error protection data is further based at least in part on writing the data in the data block; and increment a second counter associated with the data block based at least in part on writing the data.

19. The non-transitory computer-readable medium of claim 18, wherein the instructions, when executed by the processing circuitry of the electronic device, further cause the electronic device to:

determine an error associated with a page of the data block based at least in part on whether the second counter satisfies a second threshold associated with the data block;

generate third error protection data for a portion of the data in the data block that excludes the page based at least in part on determining the error and a position associated with the page;

perform a recovery operation associated with the page based at least in part on performing a first operation to generate fourth error protection data by combining the summary of contents and the third error protection data;

generate fifth error protection data for the data including the page based at least in part on performing the recovery operation;

write sixth error protection data in a second error protection buffer associated with the data block based at least in part on performing a second operation to generate the sixth error protection data by combining the fifth error protection data and the summary of contents; and write a second summary of contents of the second error protection buffer and a second position of the plurality of cursors based at least in part on writing the sixth error protection data.

20. A method, comprising:

receiving a command to write data to a memory system;

assigning the data to one or more pages associated with a cursor of the memory system based at least in part on the command;

generating error protection data for the data based at least in part on an error protection configuration; and assigning the error protection data to an error protection buffer that is stored to a nonvolatile memory of the memory system and is common to a plurality of cursors of the memory system based at least in part on generating the error protection data, the error protection buffer for storing a plurality of error protection data associated with the plurality of cursors of the memory system.

21. The method of claim 20, further comprising:

performing an operation to generate second error protection data by combining the error protection data with the plurality of error protection data associated with the plurality of cursors based at least in part on assigning the error protection data to the error protection buffer;

writing the second error protection data in the error protection buffer based at least in part on performing the operation; and incrementing a counter associated with the error protection buffer based at least in part on writing the second error protection data.

22. The method of claim 21, further comprising:

determining whether the counter satisfies a threshold associated with a quantity of pages based at least in part on incrementing the counter; and writing a summary of contents of the error protection buffer and a position of the plurality of cursors based at least in part on determining that the counter satisfies the threshold.

23. The method of claim 22, further comprising:
writing the data in a data block associated with the cursor based at least in part on the command, wherein generating the error protection data is further based at least in part on writing the data in the data block; and
incrementing a second counter associated with the data block based at least in part on writing the data.

24. The method of claim 23, further comprising:
determining whether the second counter satisfies a second threshold associated with reading back the data based at least in part on incrementing the second counter;
generating third error protection data for the data in the data block based at least in part on whether the second counter satisfies the second threshold;
performing an operation to generate fourth error protection data for the data in the data block by combining the third error protection data with the summary of contents based at least in part on generating the third error protection data;
writing the fourth error protection data in a second error protection buffer associated with the data block based at least in part on generating the third error protection data, the second error protection buffer at a location different from the error protection buffer; and
writing a second summary of contents of the second error protection buffer and a second position of the plurality of cursors based at least in part on writing the fourth error protection data.

25. The method of claim 23 further comprising:
determining an error associated with a page of the data block based at least in part on whether the second counter satisfies a second threshold associated with the data block;
generating third error protection data for a portion of the data in the data block that excludes the page based at least in part on determining the error and a position associated with the page;
performing a recovery operation associated with the page based at least in part on performing a first operation to generate fourth error protection data by combining the summary of contents and the third error protection data;
generating fifth error protection data for the data including the page based at least in part on performing the recovery operation;
writing sixth error protection data in a second error protection buffer associated with the data block based at least in part on performing a second operation to generate the sixth error protection data by combining the fifth error protection data and the summary of contents; and
writing a second summary of contents of the second error protection buffer and a second position of the plurality of cursors based at least in part on writing the sixth error protection data.

* * * * *